United States Patent [19]

Takizawa et al.

[11] Patent Number: 5,361,324
[45] Date of Patent: Nov. 1, 1994

[54] LOMBARD EFFECT COMPENSATION USING A FREQUENCY SHIFT

[75] Inventors: Yumi Takizawa, Neyagawa; Masahiro Hamada, Hirakata, both of Japan

[73] Assignee: Matsushita Electric Industrial Co., Ltd., Osaka, Japan

[21] Appl. No.: 983,246

[22] Filed: Nov. 30, 1992

Related U.S. Application Data

[63] Continuation of Ser. No. 592,542, Oct. 2, 1990, abandoned.

[30] Foreign Application Priority Data

Oct. 4, 1989 [JP] Japan ................... 1-259034
Aug. 10, 1990 [JP] Japan ................... 2-212831

[51] Int. Cl.$^5$ ............................. G10L 3/02; G10L 9/04
[52] U.S. Cl. ............................. 395/2.42; 395/2.18; 395/2.43
[58] Field of Search ........ 395/2, 2.42, 2.33, 2.35–2.37; 381/41–50, 71, 94

[56] References Cited

U.S. PATENT DOCUMENTS

| | | | |
|---|---|---|---|
| 4,461,024 | 7/1984 | Rengger et al. | 381/46 |
| 4,918,735 | 4/1990 | Morito et al. | 381/47 |
| 4,922,539 | 5/1990 | Rajasekaran et al. | 381/50 |
| 4,933,973 | 6/1990 | Porter | 381/47 |
| 4,945,568 | 7/1990 | Willems | 381/50 |
| 4,956,865 | 9/1990 | Lennig et al. | 381/50 |
| 5,001,761 | 3/1991 | Hattori | 381/46 |
| 5,040,217 | 8/1991 | Brandenburg et al. | 381/47 |

FOREIGN PATENT DOCUMENTS

2231700 11/1990 United Kingdom .

OTHER PUBLICATIONS

Furui, "Cepstral Analysis Technique for Automatic Speaker Verification," IEEE Trans. on ASSP, vol. ASSP-29, No. 2, Apr. 1981, pp. 254–272.

ICASSP'87 (1987 International Conference on Acoustics, Speech and Signal Processing, Dallas, Apr. 6th–9th 1987), vol. 2, pp. 717–720, IEEE New York, U.S.; Y. Chen "Cepstral domain stress compensation for robust speech recognition"; pp. 718, 719: Cepstral domain stress compensation–A hypothesis driven approach.

*Primary Examiner*—David D. Knepper
*Attorney, Agent, or Firm*—Wenderoth, Lind & Ponack

[57] ABSTRACT

An analyzer performs spectral analysis of a characteristic parameter of an input speech signal per unit time so as to calculate, as a recognition parameter, orthogonal expansion of a spectrum of the analyzed characteristic parameter. A formant frequency of the input speech signal is detected, and a compensation value is calculated for the recognition parameter using the formant frequency. The recognition parameter is compensated in accordance with variations of the input speech signal caused by a noisy environment using the compensation value. The compensated recognition parameter is compared with reference parameters to output a recognition result.

9 Claims, 5 Drawing Sheets

LOMBARD EFFECT COMPENSATION USING A FREQUENCY SHIFT

This application is a continuation of now abandoned application, Ser. No. 07/592,542, filed Oct. 2, 1990 now abandoned.

BACKGROUND OF THE INVENTION

The present invention relates to a speech recognizer.

In response to recent developments in speech recognition technology, speech recognizers are almost ready to be put to practical use in various fields. However, in order to achieve such practical use of speech recognizers, many problems must yet be solved.

In actual use, the operating states in which the speech recognizers are used vary, thus causing variations in the voice patterns of speech to be recognized. For example, when background noise in the vicinity of the speech recognizers becomes significant, a speaker must speak loudly, thereby resulting in variations in voice patterns. Such variations in voice patterns caused by a speaker attempting to overcome a noisy environment are called the "Lombard effect". The voice patterns also vary when the speech recognizers are used for a long time and the speaker becomes tired. Furthermore, when the speakers themselves are changed, the voice patterns vary.

Therefore, if a state in which a speech recognizer has learned a reference voice pattern is different from a state in which the speech recognizer is used, a serious problem arises in that the reference voice pattern cannot account for the above mentioned variations in voice patterns, thereby resulting in erroneous speech recognition.

In order to solve this problem, a countermeasure is employed in which the speech recognizer is made to learn all foreseeable voice pattern variations in advance. However, such is not practical in that the learning time and capacity of the speech recognizer must be increased enormously and the operator must perform extremely troublesome operations.

Thus, in recent years, a method has been proposed in which voice pattern variations are calculated each time the speech recognizer is used and analytical conditions are changed in accordance with the voice pattern variations at the time of analyzing characteristic parameters of voice pattern variations. By employing this method, voice pattern variations can be accounted for using a shorter learning time and smaller speech recognizer capacity and requiring a lesser burden on the operator.

Hereinbelow, a known speech recognizer is described with reference to FIG. 1. The known speech recognizer is of a registration type in which the reference voice pattern is made by inputting the voice of a user. As one example in which voice patterns at the time of storing a reference voice pattern and at the time of voice pattern recognition differ from each other, a case where noise in the surrounding environment varies is adopted. In FIG. 1, the known speech recognizer includes a signal input terminal 1, a power measuring portion 20, analyzers 21 and 23, a vowel deciding portion 22, a matching portion 8, and output terminal 9 for outputting a recognition result, a buffer 10 for storing the reference voice pattern and switches 24, 25 and 26.

The known speech recognizer of the above described arrangement is operated as follows. Initially, at the time of storing the reference voice pattern, environmental noise in the vicinity of the speech recognizer, immediately before the input of the reference voice signal, is input to the signal input terminal 1 and the power level of the environmental noise is calculated by the power measuring portion 20. If the power level of the environmental noise exceeds a predetermined threshold value P1, the environment is regarded as being unsuitable for storing of the reference voice pattern and thus, registration of the reference voice pattern is suspended. On the contrary, if the power of the environmental noise is not more than the threshold value P1, a reference voice pattern signal is input to the signal input terminals 1 and is fed to the analyzer 21 where a characteristic parameter is calculated. At this time, the input signal is passed through a filter F1 expressed by the following equation (i).

$$F1(z) = 1 - 0.9375 \times Z^{-1} \qquad (i)$$

In the equation (i), character Z denotes the Z-function of the FFT (fast Fourier transformation) X(f) for transforming a time function into a frequency function. Assuming that character t denotes time and character f denotes frequency, the FFT X(f) is given by:

$$X(f) = \int_0^\infty X(t)\exp(-j2\pi ft)dt$$

where $\exp(-j2\pi ft)$ is expressed by the Z-function Z, i.e. $Z \equiv \exp(-j2\pi ft)$.

After a high-frequency band of the input signal has been emphasized by the filter F1, the input signal is analyzed. If the LPC cepstrum method is carried out in the analyzer 21, a predetermined number of LPC cepstral coefficients are calculated as characteristic parameters. When the Dower level of the voice pattern exceeds a detection threshold value within a predetermined voice pattern interval, the corresponding characteristic parameter is regarded as the reference voice pattern to be stored in the buffer 10. The above described processing starting from the input of the reference voice pattern signal is performed for all words to be recognized and the registration process is then complete.

Subsequently, at the time of speech recognition, the power level of environmental noise is measured in the same manner as in the reference voice pattern registration process and then, a voice signal is input via the signal input terminal 1. If the power level of the environmental noise is not more than the threshold value P1, a characteristic parameter of the input voice signal is calculated using the analyzer 21 in the same manner as in the registration process, and the thus calculated characteristic parameter is transmitted to the matching portion 8. At the matching portion 8, the variations between the reference voice patterns and the input voice pattern is calculated and a word exhibiting a minimum variation is output as a recognition result from the output terminal 9.

On the other hand, if the power level of the environmental noise exceeds the threshold value P1, the power level of the input voice signal is calculated for each frame by the power measuring portion 20 and then, the power level of the environmental noise and the power of the input voice signal are fed to the vowel deciding portion 22. At the vowel deciding portion 22, a vowel determination is made based on the following conditions (a) and (b).

(a) The signal level is higher than a sum of the noise level and a constant C.

(b) Five or more continuous frames satisfying the above condition (a).

It is determined that a frame which satisfies the conditions (a) and (b) is a vowel. If a frame is not determined to be a vowel, the input signal is fed to the analyzer 21, a high-frequency band of the frame is emphasized using the filter expressed by the above equation (i) and the characteristic parameter is calculated in the same manner as in the case of the reference voice pattern registration process. On the other hand, if a frame is so determined to be a vowel, the input signal is fed to the analyzer 23, a high-frequency band of the frame is emphasized by a filter F2 expressed by the following equation (ii).

$$F2(Z) = 1 - 0.6375 \times Z^{-1} \qquad (ii)$$

The emphasis of the high-frequency band of the frame by the filter F2 is less than that of the filter F1 and the tilt of the equation (ii) is milder than that of the equation (i). When environmental noise becomes large, the voice state of a speaker changes such that a high-frequency band of the input voice signal becomes intense. Therefore, the tilt of a filter for emphasizing a high-frequency band in a noisy environment is required to be milder than that in a less noisy environment. After the input voice signal has been passed through the filter F2, the characteristic parameter thereof is calculated in the same manner as in the reference voice pattern registration process.

The calculated characteristic parameter is fed to the matching portion 8 and the recognition result is generated from the output terminal 9 in the same manner as in the case where the power level of the environmental noise is not more than the threshold value P1.

The switch 24 actuates to changed over to the vowel deciding portion 22 and to the analyzer 21 when the power level of the environmental noise exceeds the threshold value P1 and is not more than the threshold value P1, respectively. When no voice signal is being input, the switch 24 is in an OFF state. The switch 26 actuates to changed over to the analyzer 23 and to the analyzer 21 when the frame is determined to be a vowel and is not determined to be a vowel, respectively. Meanwhile, the switch 25 actuates to change over to the buffer 10 and to the matching portion 8 during the reference voice pattern registration process and voice recognition process, respectively.

In the above described known speech recognizer, changes in spectral tilt due to variations of voice patterns are initially compensated for, and then the parameter used for recognition of a voice signal is analyzed. Thus, the known speech recognizer suffers drawbacks in that, since the contents of the compensation are not accurately incorporated into the parameter through the analysis processing, the compensation efficiency is reduced and in some cases, the compensation does not contribute to an improvement of the recognition rate at all.

Furthermore, the known speech recognizer is disadvantageous in that, although it is possible to compensate for changes in spectral tilt, it is not possible to compensate for changes in the resonance frequency characteristic of a vocal sound (referred to as "formant frequency", hereinbelow) caused by variations of voice patterns, thereby resulting in a lowering of the recognition rate.

SUMMARY OF THE INVENTION

Accordingly, an essential object of the present invention is, with a view to eliminating the above described inconveniences inherent in the conventional speech recognizers, to provide a speech recognizer in which variations of voice signals uttered in a noisy environment are compensated for in a recognition parameter. In the present invention, spectral analysis is performed in an analyzer and orthogonal expansion of a spectrum is calculated as a recognition parameter. Furthermore, in the present invention, a compensation value is calculated in a compensation value calculator by using a formant frequency detected by a formant frequency detector, and the recognition parameter is compensated for in a parameter compensator by using a compensation value.

In order to accomplish this object of the present invention, a speech recognizer according to the present invention comprises: an analyzer which performs spectral analysis of a characteristic parameter of an input signal per unit time so as to calculate, as a recognition parameter, an orthogonal expansion of a spectrum of the analyzed characteristic parameter; a formant frequency detector for detecting a formant frequency of the input signal; a compensation value calculator for calculating a compensation value of the recognition parameter by using the formant frequency; a parameter compensator for compensating for the recognition parameter in accordance with variations of the input signal by using the compensation value; and a matching portion which calculates the variation between reference parameters and input parameters by using the compensated recognition parameter so as to output a recognition result.

In accordance with the present invention, changes of the formant frequency due to input voice variations, which have not been hitherto compensated for, can be efficiently compensated for directly on the recognition parameter, thereby resulting in a significant improvement in the recognition rate.

BRIEF DESCRIPTION OF THE DRAWINGS

The objects and features of the present invention will become apparent from the following description taken in conjunction with the preferred embodiments thereof with reference to the accompanying drawings, in which.

Before the description of the present invention proceeds, it is noted that like parts are designated by like reference numerals throughout the several views of the accompanying drawings.

DETAILED DESCRIPTION OF THE INVENTION

Figure 2:
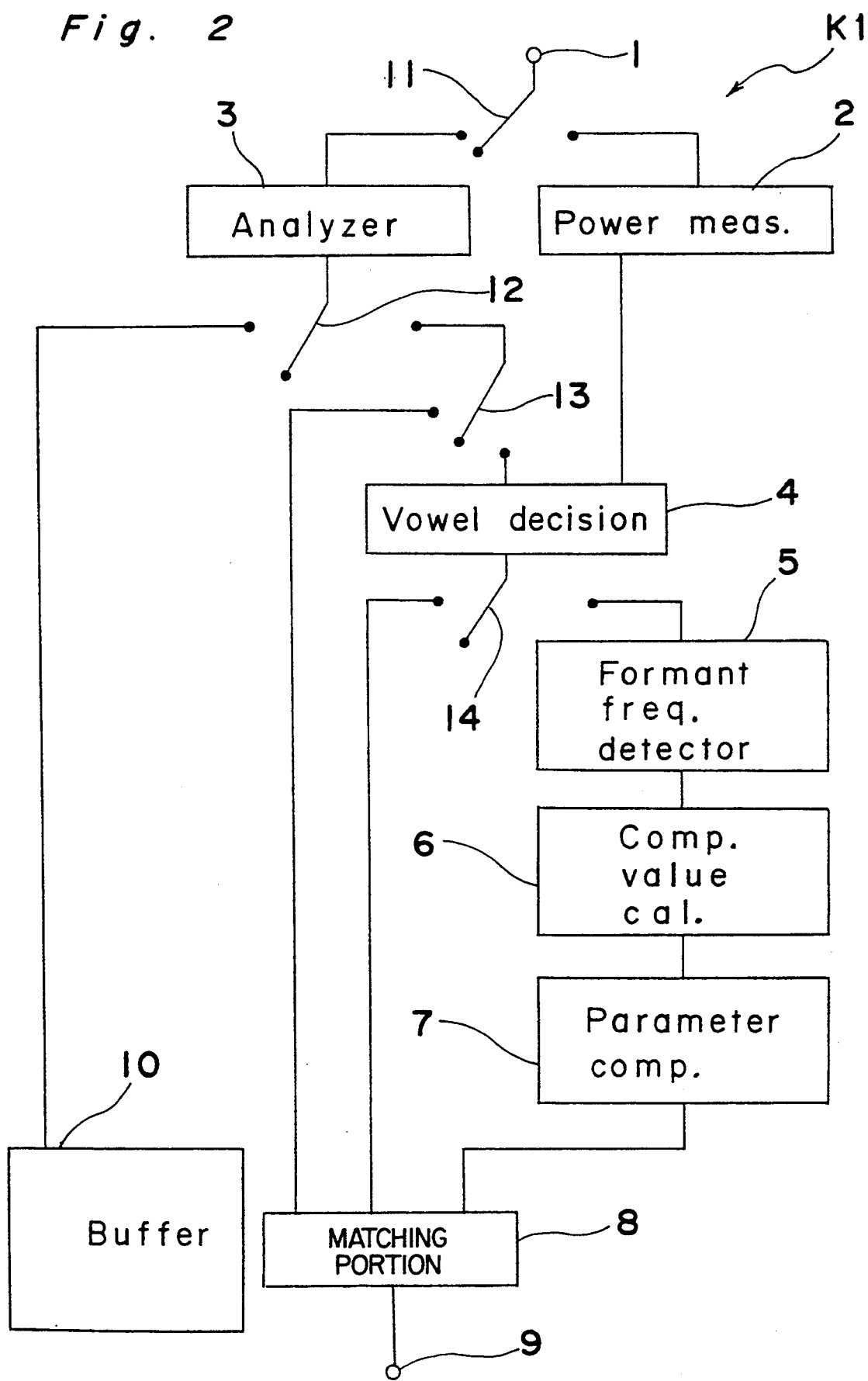
FIGS. 2 to 5 are block diagrams of speech recognizers according to first to fourth embodiments of the present invention, respectively.

Referring now to the drawings, there is shown in FIG. 2 a word speech recognizer K1 according to a first embodiment of the present invention. The speech recognizer K1 includes a signal input terminal 1, a power measuring portion 2, a first analyzer 3, a vowel deciding portion 4, a formant frequency detector 5, a compensation value calculator 6, a parameter compensator 7, a matching portion 8, an output terminal 9 for outputting a recognition result, a buffer 10 for storing a reference voice pattern and switches 11 to 14.

The operation of the speech recognizer K1 having the above described arrangement is described hereinbelow. Initially, at the time of storing the reference voice pattern, noise contained in the environment surrounding the speech recognizer K1, immediately before the input of voice signals, are input to the signal input terminal 1 and the power level of the environmental noise is calculated by the power measuring portion 2. If the power level of the environmental noise exceeds a predetermined threshold value P1, the environment is regarded as being unsuitable for the reference voice pattern registration, and thus the registration process is suspended.

On the other hand, if the power level of the environmental noise is not more than the threshold value P1, a reference voice signal input to the signal input terminal 1 is fed to the power measuring portion 2 where the power level of each frame of the reference voice signal is calculated. Meanwhile, the input reference voice signal is also fed to the first analyzer 3 where a characteristic parameter of the reference voice signal is calculated. Analysis is performed in a known manner and an LPC cepstral coefficient having a predetermined order is calculated as a recognition parameter. The recognition parameter is not restricted to an LPC cepstrum and may also be an orthogonal expansion of a spectrum. However, since an LPC cepstrum is stable as the recognition parameter and its calculation is relatively easy, an LPC cepstrum is employed in this embodiment. The recognition parameter is a frame having a power level which exceeds a detection threshold value within a predetermined voice signal interval is stored in the buffer 10. The above described processing starting from the input of the reference voice signal is performed for all words to be recognized and the registration process is then complete.

Subsequently, at the time of recognition of a voice signal, the power level of environmental noise is measured by the power measuring portion 2 in the same manner as in the reference voice signal registration process. A voice signal to be recognized is then applied to the signal input terminal 1 and an LPC cepstral coefficient of the input voice signal is calculated by the first analyzer 3 in the same manner as in the reference voice signal registration process. If the power level of the environmental noise is not more than the threshold value P1, the parameter of the input voice signal is input to the matching portion 8. At the matching portion 8, the variation between the reference voice signal parameter and the input voice signal parameter is calculated and a word exhibiting a minimum variation between the reference voice signal parameter and the input voice signal parameter is output as a recognition result from the output terminal 9.

On the other hand, if the power level of the environmental noise exceeds the threshold value P1, the power level of each frame of the input voice signal is calculated by the power measuring portion 2, and then the power level of the environmental noise and the power level of the voice signal frames are fed to the vowel deciding portion 4. At the vowel deciding portion 4, a vowel determination is made based on the following conditions (a) and (b).

(a) The signal level is higher than a sum of the noise level and a constant C.

(b) Five or more continuous frames satisfy the above condition (a).

A frame which satisfies the conditions (a) and (b) is determined to be a vowel. If it is determined that a frame is a vowel, the input voice signal is fed to the formant frequency detector 5. On the other hand, if it is determined that a frame is not a vowel, the input voice signal is fed to the matching portion 8.

When a frame is determined to be a vowel, a formant frequency of the input voice signal is detected by the formant frequency detector 5 so as to compensate for the parameter of the input voice signal. The formant frequency is obtained as follows. In the course of the calculation of the LPC cepstrum acting as the recognition parameter in this embodiment, an LPC parameter a(i) is obtained. By using this LPC parameter a(i), an acoustic spectrum S is given by:

$$S = 1/A(Z) = 1/\left(1 + \sum_{i=1}^{N} a(i) \times Z^{-i}\right)$$

where the character N denotes an order of analysis. From a real part Re(Z) and an imaginary part Im(Z) of a complex root of this A(Z), the formant frequency f is expressed by:

$$f = (fs/2\pi) \tan^{-1}[Im(Z)/Re(Z)]$$

where the character fs denotes the sampling frequency. Thus, it becomes possible to obtain the formant frequency from the LPC parameter.

Subsequently, at the compensation value calculator 6, a compensation value of the LPC cepstrum is calculated by using a product of the formant frequency and a value obtained by differentiating the LPC cepstrum by the formant frequency. Supposing that the formant frequency is fi Hz, a compensation amount H(fi, n) of the N-th cepstral coefficient is given by:

$$H(fi, n) = \sum_{i=1}^{M/2} \Delta fi \times (\delta Cn/\delta fi) \quad (1)$$

where the character $\Delta fi$ denotes a difference in the formant frequency between the presence and absence of variations of voice signals, then character Cn denotes n-th cepstral coefficient, character fi denotes the i-th formant frequency and the character (M/2) denotes the number of formant frequencies.

The n-th cepstral coefficient Cn and the term $(\delta Cn/\delta fi)$ are expressed by:

$$Cn = (2/n) \sum_{i=1}^{M/2} \exp(-n\pi bi/fs) \cdot \cos(2n\pi fu \cdot fs) \text{ and}$$

$$\delta Cn/\delta fi = (-4\pi/fs)\exp(-n\pi bi/fs) \cdot \sin(2n\pi fi/fs)$$

where the character fs denotes the sampling frequency and the character bi denotes the bandwidth of the i-th formant frequency fi.

For example, if compensation is performed for only the formant contained in a frequency range of 300–1,500 Hz and greatly changeable due to voice signal variations, in the case of fi=120 Hz, bi=150 Hz and fs=10

KHz, the equation (1) is converted into the following equation (2):

$$H(f_i, n) = -\sum_i 0.15 \times \exp(-0.047n) \times (-\sin(2n\pi f_i/1000)) \quad (2)$$

where 300 Hz $< f_i <$ 1500 Hz.

The compensation value calculated by the equation (2) is input to the parameter compensator 7 where the LPC cepstral coefficient Cn is compensated for by the following equation (3).

$$Cn = Cn + H(f_i, n) \quad (3)$$

The variation between the reference voice signal parameter and the input voice signal parameter is calculated in the matching portion 8 in the same manner as in the case where the power level of the environmental noise is not more than the threshold value P1. Then, the recognition result is output from the output terminal 9.

Meanwhile, in this embodiment, the product between the shift of the formant frequency and the partial differential of the LPC cepstrum by the formant frequency is calculated as the compensation value using the equation (1). However, the compensation value is not restricted to this scheme. For example, without using the partial differential, identical effects can be achieved by using a value indicative of tilt relative to the formant frequency. Meanwhile, generally in the case where orthogonal expansion of the spectrum is employed as the recognition parameter without using the LPC cepstrum, identical effects can be obtained by using either the transformation nucleus of the recognition parameter or the tilt of a periodic function having a period, a phase and a sign which are identical to those of the transformation nucleus. However, when the LPC cepstrum is employed as the recognition parameter, the compensation amount can be obtained easily and accurately using the equation (1). Thus, in this embodiment, the equation (1) is employed.

Meanwhile, the switch 11 actuates to change over to the power measuring portion 2 and to the first analyzer 3 at a time when the power level of the environmental noise, immediately before the input of the voice signal, is measured and at a time when the voice signal is input, respectively. The switch 12 is changed over to the buffer 10 at the time of the reference voice signal registration process and is changed over to the matching portion 8 or the vowel deciding portion 4 at the time of the voice signal recognition process. The switch 13 actuates to change over to the matching portion 8 and to the vowel deciding portion 4 at a time when the power level of the environmental noise is not more than the threshold value P1 and at a time when the environmental noise exceeds the threshold value P1, respectively. Meanwhile, the switch 14 actuates to change over to the formant frequency deciding portion 5 and to the matching portion 8 when the input voice signal is a vowel and is not a vowel, respectively.

As described above, in this embodiment, the LPC cepstral coefficient is calculated as the recognition parameter in the first analyzer and the formant frequency of the inputted signal is detected in the formant frequency detector. Furthermore, the compensation value is calculated in the compensation value calculator by using the equation (1) and the recognition parameter is compensated for in the parameter compensator by adding thereto the above compensation value in accordance with changes of the formant frequency of the input voice signal. Accordingly, contents of the compensation are accurately incorporated into the recognition parameter, thereby resulting in a improvement in the compensation efficiency. Furthermore, since it is possible to compensate for changes of the formant frequency due to voice signal variations, the recognition rate can be improved.

In this embodiment, voice signal variations in a noisy environment has been described. However, in voice signal variations due to other causes, the present invention is applicable to compensation for changes of voice signals in which the formant frequency varies. Compensation using the equation (1) is most effective for the case in which only limited formant frequencies vary under certain rules. In the case of utterance of voice signals in a noisy environment, only formant frequencies ranging from about 300 to 1,500 Hz rise, which satisfies the above described condition for the most effective compensation. Accordingly, compensation of the present invention is especially effective for variations of voice signals in a noisy environment.

Figure 3:
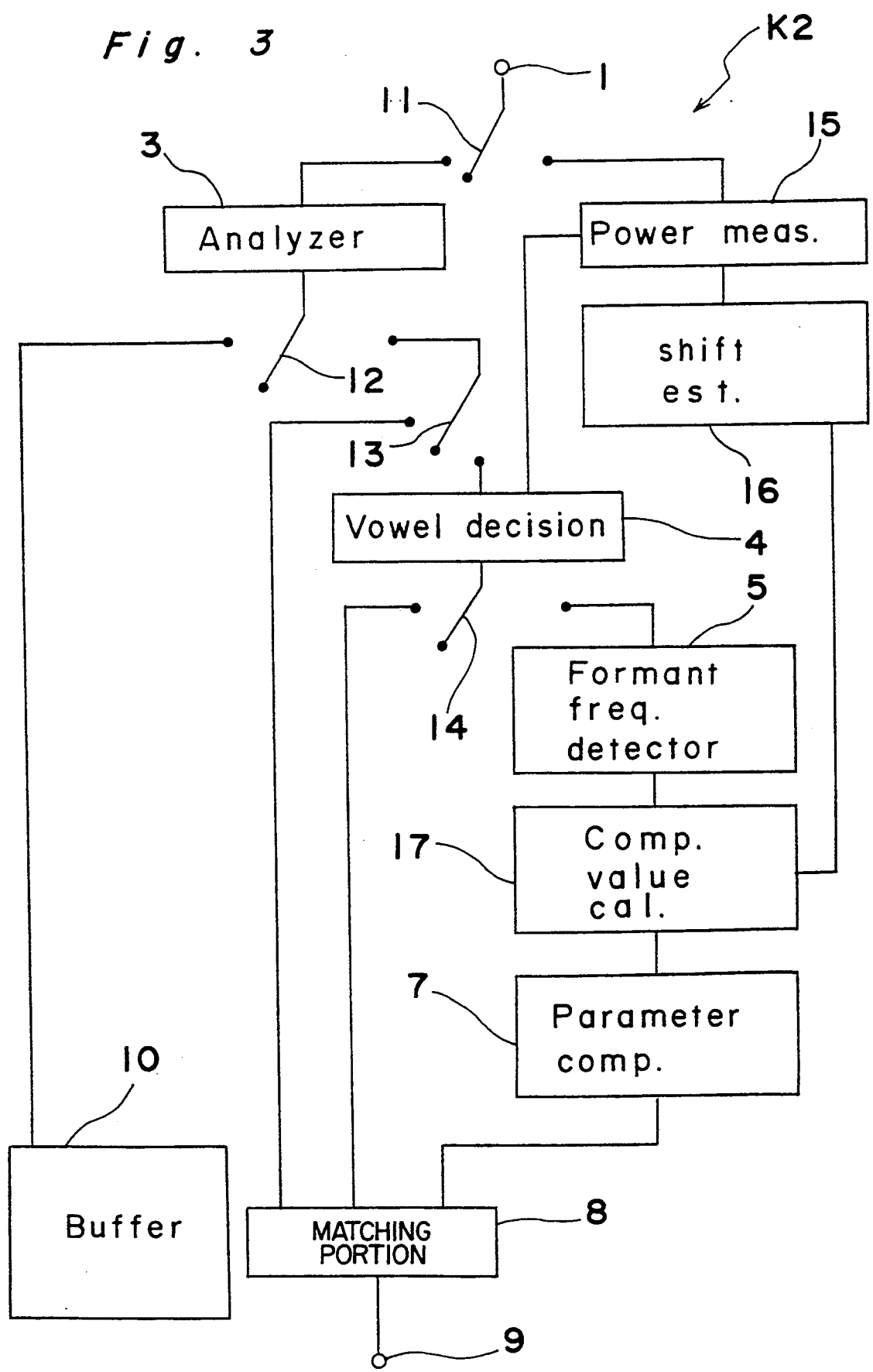

FIG. 3 shows a word speech recognizer K2 according to a second embodiment of the present invention. The speech recognizer K2 includes a power measuring portion 15, a shift estimator 16 and a compensation value calculator 17. Since other elements of the speech recognizer K2 are similar to those of the speech recognizer K1, the description thereof has been abbreviated for the sake of brevity.

The operation of the speech recognizer K2 having the above described arrangement is described hereinbelow. Initially, at the time of registration of the reference voice signal, noise contained in the environment surrounding the speech recognizer K2, immediately before the input of the reference voice signals, are input to the signal input terminal 1 and the power level of the environmental noise is calculated by the power measuring portion 15. If the power level of the environmental noise exceeds the predetermined threshold value P1, the environment is regarded as being unsuitable for registration of the reference voice signal and thus the reference voice signal registration process is suspended.

On the other hand, if the power level of the environmental noise is not more than the threshold value P1, a reference voice signal is input to the signal input terminal 1 and fed to the first analyzer 3 where a characteristic parameter of the reference voice signal is calculated. Analysis is performed in a known manner and an LPC cepstral coefficient having a predetermined order is calculated as a recognition parameter. The characteristic parameter in a frame in which the power exceeds a detection threshold value within a predetermined voice signal interval is stored in the buffer 10. The above described processing starting from the input of the reference voice signal is performed for all words to be recognized and the registration process is then complete.

Subsequently, at the time of voice signal recognition, the power level of the environmental noise is measured by the power measuring portion 15 in the same manner as in the case of reference voice signal registration process. A voice signal to be recognized is then applied to the signal input terminal 1 and a recognition parameter of the input voice signal is calculated by the first analyzer 3 in the same manner as in the reference voice signal registration process. If the power level of the environmental noise is not more than the threshold value P1, the parameter of the inputted voice signal is input to the matching portion 8. In the matching portion 8, the variation between the reference voice signal parameter and the input voice signal parameter calculated and a word exhibiting a minimum variation between the reference voice signal parameter and the input voice signal parameter is output as a recognition result from the output terminal 9.

On the contrary, if the power level of the environmental noise exceeds the threshold value P1, the power level of the environmental noise is input to the shift estimator 16. At the shift estimator 16, the shift f of the formant frequency due to the Lombard effect, i.e. variations in voice signals uttered in a noisy environment, is calculated from a power Pn of the environmental noise using the following equation (4):

$$\Delta f = 10 \text{ Hz/db} \times (Pn - P1) \quad (4)$$

where the power levels Pn and P1 are expressed in units dB and the shift $\Delta f$ is expressed in units of Hz.

The equation (4) represents that, in the case where the environmental noise is small, variations in voice signals are reduced and thus the shift of the formant frequency is also small, while in the case where the level of environmental noise is large, variations in voice signals are increased and thus the shift of the formant frequency is also large.

Subsequently, a voice signal to be recognized is input to the signal input terminal 1 and is fed to the first analyzer 3 where a parameter and power level of the input voice signal are calculated. The power level of the environmental noise and the power level of the inputted voice signal are input to the vowel deciding portion 4. At the vowel deciding portion 4, a vowel determination is made based on the above mentioned conditions (a) and (b) in the same manner as in the first embodiment. That is, a frame which satisfies the conditions (a) and (b) is determined to be a vowel. If it is determined that a frame is a vowel, the input signal is fed to the formant frequency detector 5. On the other hand, if it is determined that a frame is not a vowel, the input signal is fed to the matching portion 8.

When a frame is determined to be a vowel, a formant frequency of the input voice signal is detected so as to compensate for the parameter of the input voice signal. The formant frequency is obtained in the same manner as in the first embodiment. Therefore, it is likewise possible to obtain the formant frequency from the LPC parameter.

Subsequently, at the compensation value calculator 17, a compensation value of the LPC cepstrum is calculated by using a product of the formant frequency and a value obtained by differentiating the LPC cepstrum by the formant frequency in the same manner as in the first embodiment. The value obtained from the equation (4) is employed as the shift $\Delta f$ of the formant frequency. When compensation is performed for only formants contained in a frequency range of 300–1,500 Hz and greatly changeable due to variations in voice signals, by setting the bandwidth $bi$ of i-th formant and the sampling frequency $fs$ at 150 Hz and 10 KHz, respectively, in the equation (1), the equation (1) is converted into the following equation (5)

$$H(fi, n) = -\sum_i 1.26 \times 10^{-3} \times \Delta f \times \exp(-0.047n) \times \quad (5)$$

$$(-\sin(2\pi fi n fi \times n/10000))$$

where 300 Hz $< fi <$ 1500 Hz.

The compensation value calculated by the equation (5) is input to the parameter compensator 7 where the LPC cepstrum coefficient Cn is compensated for by the equation (3) in the same manner as in the first embodiment. The variation between the reference voice signal parameter and the input voice signal parameter is calculated in the matching portion 8 in the case where the power level of the environmental noise is not more than the threshold value P1. Then, a recognition result is output from the output terminal 9.

Meanwhile, the switches 11 to 14 are changed over in the same manner as in the first embodiment.

As described above, in the second embodiment, the power level of the environmental noise is measured by the power measuring portion and the shift of the formant frequency due to voice signal variations is estimated by the shift estimator based on the equation (4) using the power level of the environmental noise. Meanwhile, the cepstral coefficient is calculated as the recognition parameter by the first analyzer and the formant frequency of the input voice signal is detected by the formant frequency detector. Furthermore, the compensation value is calculated by the compensation value calculator using the estimated shift of the formant frequency and the parameter of the input voice signal is compensated for by the parameter compensator by adding the compensation value to the parameter of the input voice signal in accordance with variations of the inputted voice signal. Therefore, it is possible to compensate for variations of the formant frequency due to utterances in a noisy environment and thus the recognition rate is improved.

Meanwhile, by compensating for the recognition parameter itself, the contents of the compensation are accurately incorporated into the recognition parameter, thereby resulting in an improvement in the compensation efficiency. Furthermore, when the compensation value which is proper for the magnitude of the environmental noise is employed by estimating the shift of the formant frequency from the power level of the environmental noise, it is possible to further improve the compensation effects.

Figure 4:
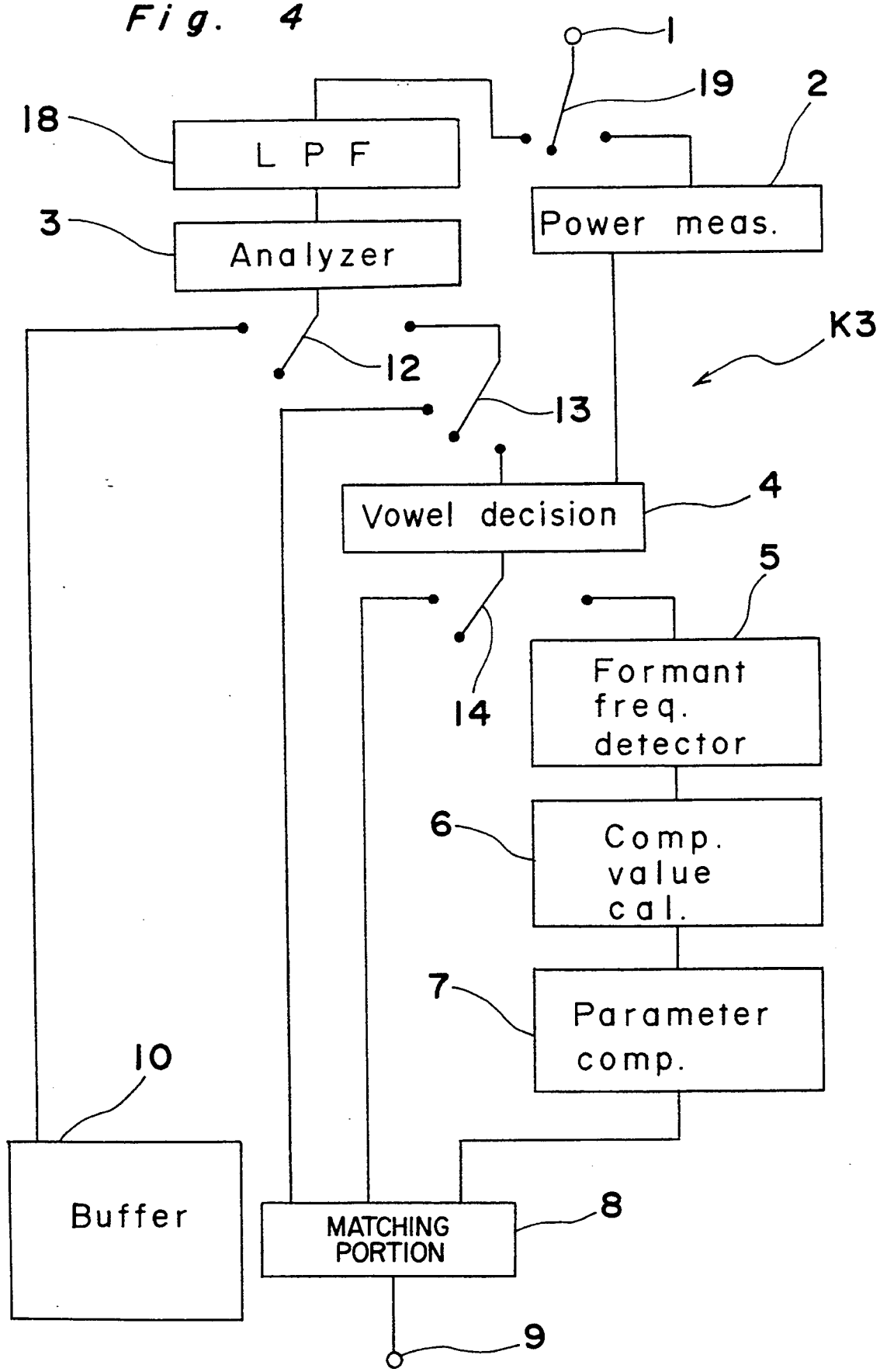

FIG. 4 shows a word speech recognizer K3 according to a third embodiment of the present invention. The speech recognizer K3 includes a low-pass filter 18 and a switch 19. Since other elements of the speech recognizer K3 are similar to those of the speech recognizer K1, a description thereof has been abbreviated for the sake of brevity.

The operation of the speech recognizer K3 of the above described arrangement is described hereinbelow. Initially, at the time of the reference voice signal registration, noise contained in the environment surrounding the speech recognizer K3, immediately before the input of voice signals, are input to the signal input terminal 1 and the power level of the environmental noise is calculated by the power measuring portion 2. If the power level of the environmental noise exceeds the threshold value P1, the environment is regarded as being unsuitable for registration of the reference voice signals and the registration process is thus suspended.

On the other hand, if the power level of the environmental noise is not more than the threshold value P1, the reference voice signal is input to the low-pass filter 18. After the cut-off frequency has passed through the 2.5 KHz low-pass filter 18, the reference voice signal is fed to the first analyzer 3. At the first analyzer 3, the LPC cepstral coefficient having a predetermined order is calculated as the recognition parameter. Analysis is performed in the same manner as in the above first and second embodiments. The characteristic parameter in a frame in which the power exceeds a detection threshold value within a predetermined voice signal interval is stored in the buffer 10. The above described processing starting from the input of the reference voice signal is performed for all words to be recognized and the registration process is then complete.

Subsequently, at the time of voice signal recognition the power level of environmental noise is measured by the power measuring portion 2 in the same manner as in the reference voice registration process and then, a voice signal to be recognized is input to the signal input terminal 1. The input voice signal is passed through the low-pass filter 18 in the same manner as in the reference voice registration process and is then fed to the first analyzer 3 where the LPC cepstral coefficient is calculated as the parameter of the input voice signal.

If the power level of the environmental noise is not more than the threshold value P1, this parameter is input to the matching portion 8. In the matching portion 8, the variation between the reference voice signal parameter and the inputted voice signal parameter is calculated and a word exhibiting a minimum variation between the reference voice signal and the inputted voice signal is output as a recognition result from the output terminal 9.

On the contrary, if the power level of the environmental noise exceeds the threshold value P1, the power level of the environmental noise is input to the vowel deciding portion 4 together with the power level of the input voice signal which is calculated in the analyzer 3 together with the parameter. At the vowel deciding portion 4, a vowel determination is made based on the above described conditions (a) and (b) in the same manner as in the first embodiment. If it is determined that a frame is a vowel, the parameter of the input voice signal is fed to the formant frequency detector 5. On the other hand, if it is determined that a frame is not a vowel, the parameter of the input voice signal is fed to the matching portion 8.

When a frame is determined to be a vowel, a formant frequency of the input voice signal is detected by the formant frequency detector 5 so as to compensate for the parameter of the input voice signal. The formant frequency is obtained from the LPC parameter in the same manner as in the first embodiment.

Subsequently, at the compensation value calculator 6, a compensation value of the LPC cepstrum is calculated using a product of the formant frequency and a value obtained by differentiating the LPC cepstrum by the formant frequency in the same manner as in the first embodiment.

Under the same conditions as in the first embodiment, the compensation value of the equation (2) and the compensated LPC cepstral coefficient of the equation (3) are obtained in the same manner as in the first embodiment.

The switch 19 actuates to change over to the power measuring portion 2 and the low-pass filter 18 when the power level of the environmental noise immediately before the input of the voice signal is measured and when the voice signal is input, respectively. The switches 12 to 14 are changed over in the same manner as in the first embodiment.

As described above, in this embodiment, the high-band spectrum, in which voice patterns vary greatly and the formant power increases, is eliminated by the low-pass filter, while the linear prediction coefficient and the cepstral coefficient are calculated by the analyzer. Meanwhile, the low formant frequency is detected by the formant frequency detector and the compensation value is calculated in the compensation value calculator by using the equation (1). Furthermore, the parameter is compensated for by the compensation value in accordance with variations of the pattern of the input signal in the parameter compensator and the variation between the compensated parameter of the inputted voice signal and the parameter of the reference voice signal is calculated. Thus, since the low formant frequency is positively detected, changes of the formant frequency, which are primarily caused by the variations of the voice signals, can be reliably compensated for each input voice signal by using the detected formant frequency. Meanwhile, since the high-band spectrum in which voice patterns vary greatly has been eliminated by using the low-pass filter, it becomes possible to take into account the deviations of the recognition parameters caused by differences in voice signals. Consequently, it is possible to improve the recognition rate in a noisy environment.

Figure 1:
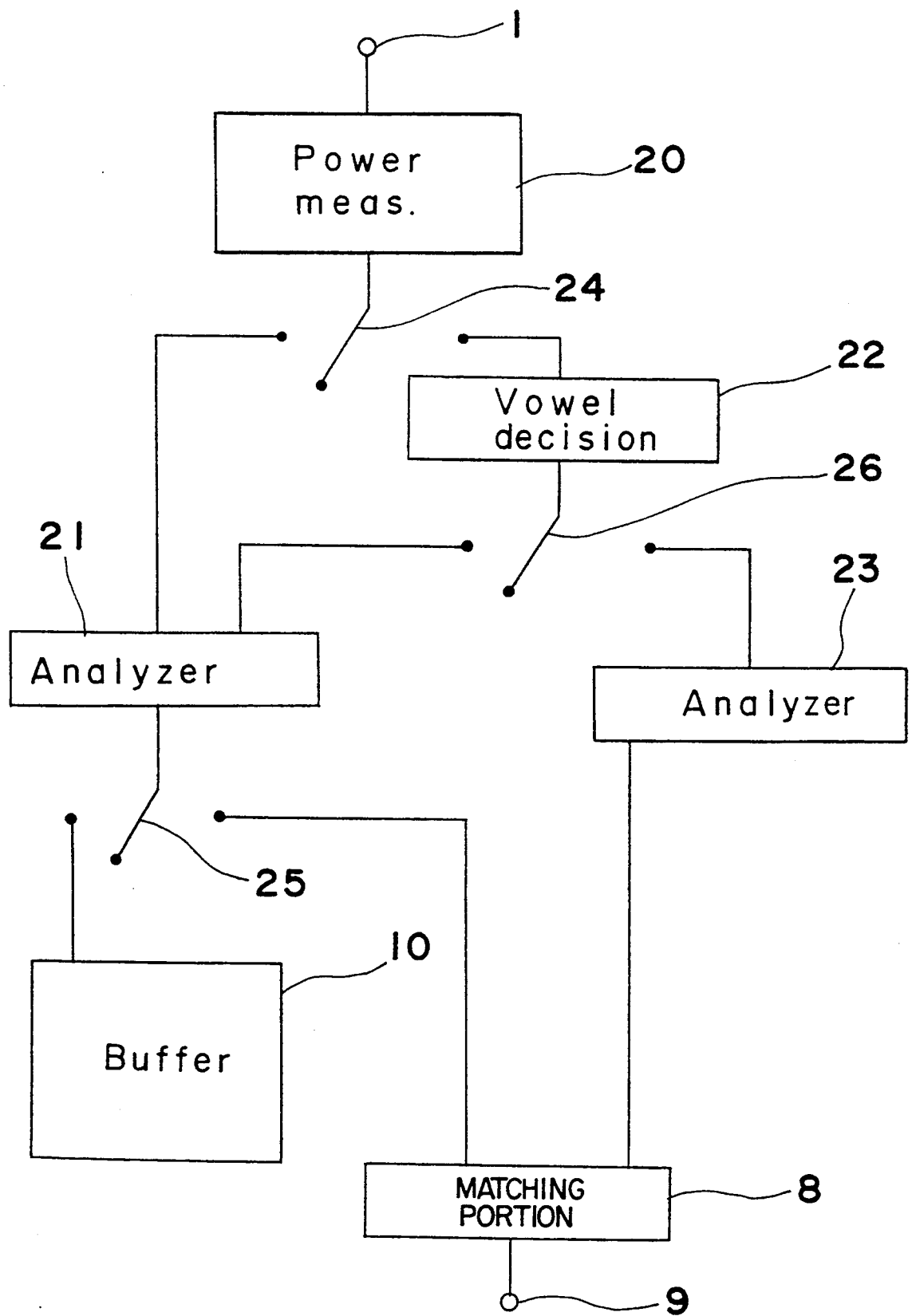
FIG. 1 is a block diagram of a prior art speech recognizer (already referred to)
Figure 5:
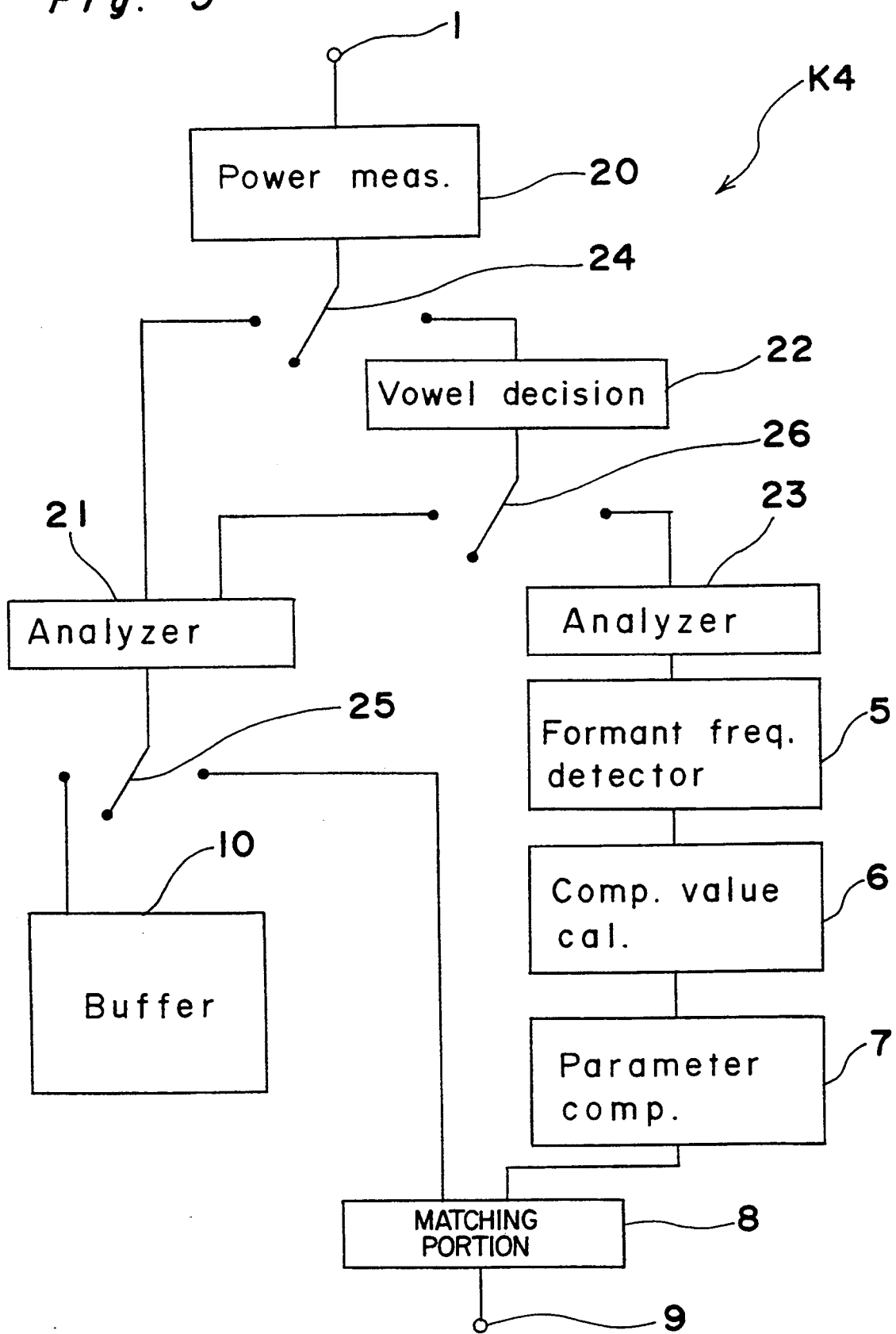

Lastly, FIG. 5 shows a word speech recognizer K4 according to a fourth embodiment of the present invention. The speech recognizer K4 includes a power measuring portion 20, second and third analyzers 21 and 23 and switches 24, 25 and 26. The second and third analyzers 21 and 23 are the same as the analyzers 21 and 23 of the known speech recognizer of FIG. 1, respectively. Since other elements of the speech recognizer K4 are similar to those of the speech recognizer K1, a description thereof has been abbreviated below for the sake of brevity.

The operation of the speech recognizer K4 of the above described arrangement is described hereinbelow. Initially, at the time of registration of the reference voice signal, noise contained in the environment surrounding the speech recognizer K4, immediately before input of voice signals, is input to the signal input terminal 1 and the power level of the environmental noise is calculated by the power measuring portion 20. If the power level of the environmental noise exceeds the threshold value P1, the environment is regarded as being unsuitable for registration of the reference voice signal and thus, the registration process is suspended.

On the other hand, if the power level of the environmental noise is not more than the threshold value, a reference voice signal is input to the signal input terminal 1 and is fed to the second analyzer 21 where an LPC cepstral coefficient is calculated as a recognition parameter. At the second analyzer 21, the input signal is passed through a filter F1 expressed by the following equation (6):

$$F1(Z) = 1 - 0.9375 \times Z^{-1} \qquad (6)$$

where the character Z denotes a Z-function.

After the high-band spectrum of the input signal has been emphasized by the filter F1, the input signal is analyzed. When the power level of the environmental noise exceeds a detection threshold value within a predetermined voice signal interval, the corresponding characteristic parameter is regarded as the reference voice signal parameter to be stored in the buffer 10. The above described processing starting from the input of the reference voice signal is performed for all words to be recognized and the registration process is then complete.

Subsequently, at the time of recognition of a voice signal, the power level of environmental noise is measured in the same manner as in the reference voice registration process and then, a voice signal to be recognized in input to the signal input terminal 1. If the power level of the environmental noise is not more than the threshold value P1, the input voice signal is passed through the filter F1 in the same manner as in the reference voice registration process and then, a characteristic parameter of the input voice signal is calculated in the second analyzer 21 so as to be input to the matching portion 8. In the matching portion 8, the variation between the reference voice signal parameter and the input voice signal parameter is calculated and a word exhibiting a minimum variation between the reference voice signal parameter and the input voice signal parameter is output as a recognition result from the output terminal 9.

On the other hand, if the power level of the environmental noise exceeds the threshold value P1, power level of the voice signal is calculated for each frame by the power measuring portion 20. Then, the power level of the environmental noise and the power level of the voice signal are input to the vowel deciding portion 22. At the vowel deciding portion, a vowel determination is made based on the above described conditions (a) and (b) in the same manner as in the first embodiment. Hence, it is determined that a frame satisfying the conditions (a) and (b) is a vowel. If it is determined that a frame is a vowel, the input voice signal is fed to the third analyzer 23. On the other hand, if it is determined that a frame is not a vowel, the input voice signal is fed to the second analyzer 21.

When a frame is determined to be a vowel, a high-frequency band of the frame is emphasized by a filter F2 expressed by the following equation (7).

$$F2(Z) = 1 - 0.6375 \times Z^{-1} \quad (7)$$

Emphasis of the high-frequency band of the frame by the filter F2 is less than that of the filter F1 and the tilt of the equation (7) is milder than that of the equation (6). When the environmental noise becomes large, the utterance state of a speaker changes such that the high-band spectrum of the voice signal becomes intense. Therefore, the tilt of the filter for emphasizing the high-band spectrum in the noisy environment is required to be milder than that in the less noisy environment. After the input voice signal has passed through the filter F2, the characteristic parameter of the input voice signal is obtained in the same manner as in the reference voice signal registration process.

Subsequently, the formant frequency of the input voice signal is detected by the formant frequency detector 5. The formant frequency is obtained from the LPC parameter in the same manner as in the first embodiment.

Thereafter, a compensation value of the LPC cepstrum is calculated by the compensation value calculator 6 in the same manner as in the first embodiment.

Under the same conditions of the first embodiments the compensation value of the equation (2) and the compensated LPC cepstrum of the equation (3) are obtained in the same manner as in the first embodiment.

The switch 24 actuates to change over to the vowel deciding portion 4 and to the second analyzer 21 when the power level of the environmental noise exceeds the threshold value P1 and when the same is not more than the threshold value P1, respectively. The switch 25 actuates to change over to the buffer 10 and the matching portion 8 at the time of the registration process and at the time of the recognition process, respectively. The switch 26 actuates to change over to the third analyzer 23 and the second analyzer 22 when a frame is determined to be a vowel and when a frame is determined not to be a vowel, respectively.

As described above, in this embodiment, the linear coefficient of the filter for emphasizing the high-band spectrum is changed only for a voice signal which varies greatly in a noisy environment having a small signal-to-noise ratio, in the third analyzer 23, such that emphasis of the high-band spectrum of the voice is lessened. Then, the linear prediction coefficient and the cepstrum parameter are calculated and the low formant frequency is detected by the formant frequency detector. Meanwhile, the compensation value is calculated in the compensation value calculator by using the formant frequency and the transformation nucleus of each parameter. Furthermore, the parameter of the input signal is compensated for in accordance with changes in the formant frequency o the input signal by the parameter compensator and the variation between the compensated parameter of the input voice signal and the parameter of the reference voice signal is calculated by the matching portion. Therefore, the peak of the high formant frequency is restricted to a low level. As a result, the low formant frequency can be accurately detected. By using the detected formant frequency, changes of the formant frequency, which primarily cause variations in voice signals, can be accurately compensate for each input voice signal.

Meanwhile since emphasis of the high-band spectrum is lessened, the power level of the high-band spectrum caused by variations in voice signals is restricted, so that it is possible to take into account deviations of the recognition parameter caused by differences in voice signals. Consequently, the recognition rate in a noisy environment can be improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A speech recognition apparatus comprising:
   an analyzer for receiving an input voice signal and for calculating, as a recognition parameter, an orthogonal expansion of a spectrum of a characteristic parameter of said input voice signal per unit time;
   a formant frequency detector for detecting a formant frequency of said input voice signal;
   a compensation value calculator for calculating, by using a value of the formant frequency detected formant frequency detector, a compensation value for compensating variations of the input voice signal caused by a Lombard effect;

a parameter compensator for compensating, by using the compensation value calculated by said compensation value calculator, the recognition parameter so to obtain a compensated recognition parameter;

a matching portion for comparing said compensated recognition parameter with a plurality of predetermined reference parameters and for generating a recognition result corresponding to one of said predetermined reference parameters.

2. A speech recognizer as claimed in claim 1, wherein said analyzer calculates a cepstral coefficient as said recognition parameter.

3. A speech recognizer as claimed in claim 1, wherein said compensation value calculator calculates said compensation value by using a shift of said formant frequency caused by the Lombard effect of the input voice signals and a periodic equation indicative of a relation between the recognition parameter and said formant frequency.

4. A speech recognizer as claimed in claim 1, wherein said compensation value calculator calculates said compensation value by using a shift of said formant frequency caused by the Lombard effect of the input voice signals and a linear differential value of the recognition parameter relative to said formant frequency, said linear differential value indicative of a ratio of a quantity of change of said recognition parameter to a quantity of change of said formant frequency.

5. A speech recognizer as claimed in claim 1, wherein said compensation value calculator calculates said compensation value by using a shift of said formant frequency caused by the Lombard effect of the input voice signals and a value indicative of a differentiation of the recognition parameter relative to a change in the formant frequency.

6. A speech recognizer as claimed in claim 1, wherein said compensation value calculator calculates the compensation value based on the following equation (1):

$$H(fi, n) = \sum_{i=1}^{M/2} \Delta fi \times (\delta Cn/\delta fi) \qquad (1)$$

where H(fi, n) denotes a compensation amount of an n-th cepstral coefficient Cn when the formant frequency is fi Hz, where $\Delta fi$ denotes a difference in the formant frequency between a presence and an absence of variations in voice signals, where fi denotes an i-th formant frequency and where M/2 denotes a number of formant frequencies;

where the n-th cepstral coefficient Cn and a term ($\delta Cn/\delta fi$) of the equation (1) are given by:

$$Cn = (2/n) \sum_{i=1}^{M/2} \exp(-n\pi bi/fs) \cdot \cos(2n\pi fi/fs) \text{ and}$$

$$\delta Cn/\delta fi = (-4\pi/fs)\exp(-n\pi bi/fs) \cdot \sin(2n\pi fi/fs)$$

where bi denotes a bandwidth of the i-th formant frequency fi and where fs denotes a sampling frequency.

7. A speech recognition apparatus comprising:

a power level detector for detecting a power level of ambient noise;

a shift estimator for estimating a shift of a formant frequency of an input voice signal caused by a Lombard effect of the said input voice signal resulting from said power level of said ambient noise;

an analyzer for receiving said input voice signal and for calculating, as a recognition parameter, an orthogonal expansion of a spectrum of a characteristic parameter of said input voice signal per unit time;

a formant frequency detector for detecting said formant frequency of said input voice signal;

a compensation value calculator for calculating, by using the shift of the formant frequency estimated by said shift estimator, a compensation value for compensating variations of the input voice signal caused by the Lombard effect;

a parameter compensator for compensating, by using the compensation value calculated by said compensating value calculator, the recognition parameter so to obtain a compensated recognition parameter;

a matching portion for comparing said compensated recognition parameter with a plurality of predetermined reference parameters and for generating a recognition result corresponding to one of said predetermined reference parameters.

8. A speech recognition apparatus comprising:

a low pass filter for filtering a high-frequency voice signal band of an input voice signal;

an analyzer for receiving the high-frequency band filtered input voice signal and for calculating, as a recognition parameter, an orthogonal expansion of a spectrum of a characteristic parameter of said high-frequency band filtered input voice signal per unit time;

a formant frequency detector for detecting a formant frequency of said input voice signal;

a compensation value calculator for calculating, by using a value of the format frequency detected by said formant frequency detector, a compensation value for compensating variations of the input voice signal caused by a Lombard effect;

a parameter compensator for compensating, by using the compensation value calculated by said compensation value calculator, the recognition parameter so to obtain a compensated recognition parameter;

a matching portion for comparing said compensated recognition parameter with a plurality of predetermined reference parameters and for generating a recognition result corresponding to one of said predetermined reference parameters.

9. A speech recognition apparatus comprising:

a spectral compensator for altering a spectral linear differential value indicative of a spectral change of an input voice signal to obtain a compensated input voice signal having a spectral linear differential value which is coincident with that of a reference signal;

an analyzer for receiving said compensated input voice signal and for calculating, as a recognition parameter, an orthogonal expansion of a spectrum of a characteristic parameter of said compensated input voice signal per unit time;

a formant frequency detector for detecting a formant frequency of said input voice signal;

a compensation value calculator for calculating, by using a value of the format frequency detected by said formant frequency detector a compensation value for compensating variations of the input voice signal caused by a Lombard effect of the input voice signal and said formant frequency;

a parameter compensator for compensating, by using the compensation value calculated by said compensation value calculator, the recognition parameter so to obtain a compensated recognition parameter;

a matching portion for comparing said compensated recognition parameter with a plurality of predetermined reference parameters and for generating a recognition result corresponding to one of said predetermined reference parameters.

* * * * *